Patented May 4, 1948

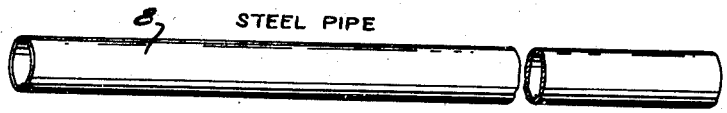
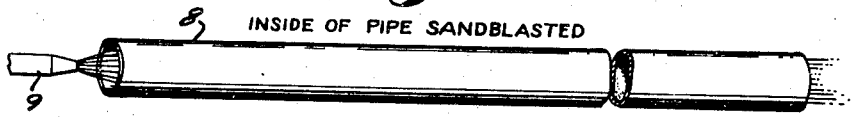
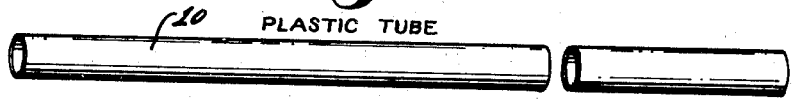
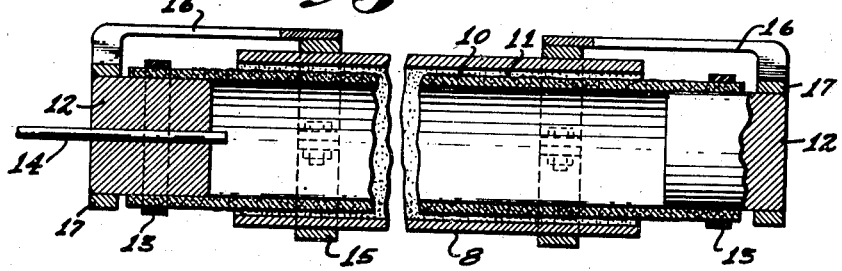
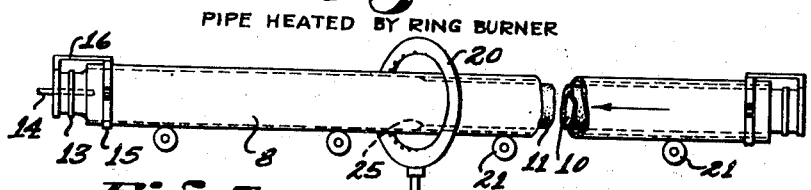
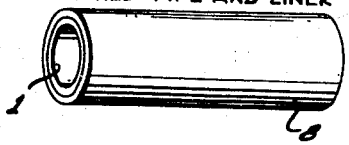

2,440,725

UNITED STATES PATENT OFFICE 2,440,725

METHOD OF MAKING COMPOSITE PLASTIC LINED METAL PIPE

Charles G. Munger, San Gabriel, Calif., assignor to American Pipe and Construction Co., a corporation of Delaware Application September 4, 1944, Serial No. 552,624

5 Claims. (Cl. 154—82)

The present invention relates to the method of making a composite plastic lined metal pipe of the type wherein a tube of plastic material is bonded to the interior of the pipe.

Composite pipes of the type herein described are of extremely wide use. For instance, they are particularly desirable for conveying chemicals or food products so that such substances are kept free from contamination by the iron or other metal of the pipe. In the case of chemicals such as caustic, acids of all kinds, and corrosive salts, the plastic lining keeps the pipe entirely free from contact with the chemicals. This is an essential in the chemical and allied industries. As further illustrations, the composite pipe of my invention may be used in the wine industry for conveying wine throughout the winery protected from any contamination from the iron or other metal of which the pipe may be made, and it is apparent that the composite pipe may be used for brandies and distilled liquors and in the milk industry and in other food industries where contamination is to be avoided.

The method of this invention, while useable for any size pipe, is particularly adaptable for the production of small pipe as, for instance, one-half to one inch pipe, as it is not necessary to insert any mechanism into the interior of the pipe during the operation.

It is an object of this invention to provide a simple and economical method of making a composite pipe consisting of metal with a lining tube of plastic material.

It is a further object of this invention to provide a simple and economical method of making a composite plastic lined metal pipe in which the plastic is completely bonded to the interior of the metal pipe throughout its length without any unbonded areas caused by bubbles of air between the plastic and the metal.

The plastics used for making the tubular lining of the metal pipe are preferably of the thermoplastic type, but when the composite pipe is to be used under certain conditions in which the composite pipe is subjected to heat, it will be understood that plastic of the thermosetting type may be used.

For the purpose of making the plastic tube more impervious to water and chemicals and thus be completely inert, it is desirable that in making the plastic, the plastic have combined therewith pigments or plasticisors or both. The use of such materials in plastic is well known and it is to be understood that when the term "plastic" is used herein it is not necessarily limited to such compositions but is intended to include all such materials as synthetic and natural resins, polymers and elastomers.

Other objects and advantages will appear hereinafter from the following description and drawings.

Referring to the drawings, which are for descriptive purposes only:

Fig. 1 is a side perspective view of a length of steel pipe such as is used in making the composite pipe of the present invention;

Fig. 2 is a view similar to Fig. 1, illustrating a step of the method consisting of sandblasting the interior of the steel pipe;

Fig. 3 is a perspective view of a length of plastic tube such as may be used in producing the composite pipe of this invention;

Fig. 4 is a view similar to Fig. 3, showing the plastic pipe coated with adhesive;

Fig. 5 is an enlarged fragmentary longitudinal sectional view of a length of metal pipe with a plastic tube therein, illustrating the manner of closing the end of the tube;

Fig. 6 is a side elevation of the unit shown in Fig. 5 diagrammatically illustrating a support for the unit as the unit extends through a ring burner and illustrating the expanding of the tube and forcing of the air from between the tube and pipe; and Fig. 7 is a perspective view of a finished composite plastic lined metal pipe made according to this invention.

It is to be understood that the drawings are merely diagrammatic for illustrative purposes and the method of the present invention described in connection therewith is as follows:

The method of producing the composite pipe herein referred to is as follows: The inside of the metal pipe 8 is preferably cleaned as, for instance, as shown in Fig. 2 by sandblasting the inside of the pipe with a nozzle indicated at 9, or by dipping the pipe in a standard pickling bath as, for instance, when the pipe is of steel the bath should preferably consist of hot sulphuric acid and should the steel pipe be etched as just referred to it is preferable to passivate the steel to prevent it from rusting prior to the installation of the plastic tube or liner, such as is done by dipping the pipe in a phospheric acid-chromic acid solution followed by washing and drying.

After the steel pipe, indicated at 8 on the drawings, has been etched or otherwise cleaned as above described, a plastic tube such as indicated at 10 of slightly smaller diameter than the interior diameter of the steel pipe is covered with an adhesive indicated at 11. The plastic tube, which is preferably longer than the pipe, is placed within the pipe as shown in Fig. 5, the ends of the tube extending beyond the ends of the pipe although it should be understood that the plastic tube may be of the same length or even somewhat shorter than the pipe. The term "tube" as used herein is inclusive of any plastic tube whether of the extruded type, or seamed type.

The next step is the closing of the ends of the plastic tube. This is done by means of plugs indicated at 12 which fit into the ends of the plastic tube and which may be of any desired material that will hold pressure but preferably steel or some similar metal. The ends of the plastic tube are clamped around the plugs 12 by means of yieldable bands indicated at 13 and which firmly seal the ends of the tube about the plugs. A pipe indicated at 14 is sealed in one of the plugs 12 for the introduction of fluid pressure into the tube from any suitable pressure source (not shown).

It is preferable, although not necessary, to support the plastic tube in the pipe in spaced relation to the interior of the metal pipe and to accomplish this I preferably use a band indicated at 15 which is clamped about the pipe 8 near its end, such band 15 having an arm or bracket indicated at 16 extending beyond the end of the pipe 8 and beyond the end of the plastic tube 11 terminating in a ring indicated at 17 which receives the outer or exposed end of the plugs 12.

The unit consisting of the steel pipe, plastic tube, etc., as shown in Fig. 5, is then passed bodily through a limited heating zone as shown in Fig. 6. In the form shown, this heating zone is produced by a circular gas burner indicated at 20. Merely as an example, I have found that with common forms of plastics of the vinyl type resins temperatures from 200° F. to 300° F. are sufficient but it is to be understood that the degree of heat necessary will vary with different plastic materials. For the purpose of passing the unit through the heating zone I have shown the unit supported on a series of rollers indicated at 21 but it is to be understood that any other form of support which will support the unit and permit the unit to be moved horizontally through the heating zone may be used.

While I have shown a circular gas burner indicated at 20, it is to be understood that any form of heating apparatus, such as, for instance, an induction coil, may be used so long as the heating element produces a limited heating zone which extends entirely around the unit.

It is to be understood that the fluid pressure such as hydraulic or air is maintained inside the plastic tube during the heating operation and as the unit moves through the heating zone as, for instance, in the direction of the arrow shown in Fig. 6, the plastic tube softens and expands into contact and is bonded to the interior of the metal pipe. This expanding movement of the plastic tube may be likened to a wave indicated in dotted lines at 25 in Fig. 6 which, as the tube expands, forces any air between the tube and the pipe to be squeezed ahead of the wave and out of the end of the unit so that when the pipe is finished no air bubbles remain between the tube and the pipe.

It will be understood that after the entire unit has been moved through the heating zone a composite plastic lined metal pipe is produced of the character shown diagrammatically in Fig. 7, it being understood that after the passing of the unit through the heating zone has been completed the plugs 12 and supporting structure for the plugs are removed.

While I have illustrated and described a specific method of producing a composite plastic lined metal pipe, it is to be understood that I do not limit my invention to the particular details shown and described but intend to cover such modifications as come within the appended claims.

I claim as my invention:

1. The method of making a composite plastic lined metal pipe which comprises: coating the outside of a plastic tube with adhesive; inserting the coated tube into the pipe; the tube being of slightly smaller diameter than the inside diameter of the pipe and providing a space therebetween open to atmosphere; closing the ends of the plastic tube; introducing fluid under pressure into the tube and passing the pipe with the tube therein, while under pressure, progressively longitudinally through a heating zone.

2. The method of making a composite plastic lined metal pipe which comprises: coating the outside of a plastic tube with adhesive; inserting the coated tube into the pipe; the tube being of slightly smaller diameter than the inside diameter of the pipe and providing a space therebetween open to atmosphere; closing the ends of the plastic tube; introducing fluid under pressure into the tube and passing the pipe with the tube therein, while under pressure, axially through a heating zone of limited extent surrounding the pipe.

3. The method of making a composite plastic lined metal pipe which comprises: inserting a plastic tube into the pipe; the tube being of slightly smaller diameter than the inside diameter of the pipe and providing a space therebetween open to atmosphere; closing the ends of the plastic tube; introducing fluid under pressure into the tube and passing the pipe with the tube therein, while under pressure, progressively longitudinally through a heating zone.

4. The method of making a composite plastic lined metal pipe which comprises: coating the outside of a plastic tube with adhesive; inserting the coated tube into the pipe; the tube being of slightly smaller diameter than the inside diameter of the pipe and providing a space therebetween open to atmosphere; closing the ends of the plastic tube; introducing fluid under pressure into the tube; subjecting limited areas of the pipe and tube successively to heat to soften the tube sufficiently to allow expansion of the tube into contact with the interior of the pipe by the fluid pressure within the tube progressively from one end of the tube to the other, thereby exhausting the air between the pipe and tube ahead of the heated portion.

5. The method of making a composite plastic lined metal pipe which comprises: providing a metal pipe and a plastic lining tube, the latter having a lesser external diameter than the internal diameter of the pipe; coating the outer surface of the tube with adhesive; inserting the tube in the pipe and maintaining the same in spaced relation to the inner surface of the pipe; inflating said tube; and expanding said tube into contact with the pipe progressively axially thereof by subjecting the pipe to heat progressively axially thereof while maintaining the tube inflated.

CHARLES G. MUNGER.

REFERENCES CITED

The following references are of record in the file of this patent:

UNITED STATES PATENTS

| Number | Name | Date |
|---|---|---|
| 667,646 | Bergier | Feb. 5, 1901 |
| 1,301,714 | Kueppers | Apr. 22, 1919 |
| 1,395,963 | Kueppers | Nov. 1, 1921 |
| 1,755,416 | Wachowitz | Apr. 22, 1930 |
| 2,027,961 | Currie | Jan. 14, 1936 |
| 2,160,371 | Schnabel | May 30, 1939 |
| 2,343,096 | Stahl | Feb. 29, 1944 |
| 2,417,881 | Munger | Mar. 25, 1947 |
| 2,423,902 | Peterson | July 15, 1947 |

FOREIGN PATENTS

| Number | Country | Date |
|---|---|---|
| 323,054 | Great Britain | Dec. 24, 1929 |
| 374,842 | Great Britain | June 2, 1932 |
| 497,486 | Great Britain | Dec. 19, 1938 |